United States Patent [19]

Choi

[11] Patent Number: 5,042,035

[45] Date of Patent: Aug. 20, 1991

[54] METHOD AND APPARATUS FOR CONTROLLING FAULT-STATE DISPLAYING OF A SUBSCRIBER'S CARD IN SWITCHING SYSTEM

[75] Inventor: Jong-Yung Choi, Seoul, Rep. of Korea

[73] Assignee: SamSung Electronics Co., Ltd, Suwon, Rep. of Korea

[21] Appl. No.: 373,404

[22] Filed: Jun. 30, 1989

[30] Foreign Application Priority Data

Jun. 30, 1988 [KR] Rep. of Korea ............... 1988-8011

[51] Int. Cl.$^5$ ............................................. G06F 11/00
[52] U.S. Cl. .................................. 371/29.1; 371/15.1
[58] Field of Search ...................... 371/29.1, 22.1, 18, 371/15.1, 16.1, 16.5; 364/200 MS File, 900 MS File

[56] References Cited

U.S. PATENT DOCUMENTS

| | | | |
|---|---|---|---|
| 3,707,714 | 12/1972 | Plumley | 371/29.1 X |
| 4,200,224 | 4/1980 | Flint | 371/29.1 X |
| 4,633,469 | 12/1986 | Kishi | 371/29.1 |
| 4,829,520 | 5/1989 | Toth | 371/29.1 X |

Primary Examiner—Jerry Smith
Assistant Examiner—Robert W. Beausoliel
Attorney, Agent, or Firm—Robert E. Bushnell

[57] ABSTRACT

A method and apparatus for controlling a fault-state displaying means of subscriber's card in a switching system. The subscriber's card has a plurality of subscriber's ports, a plurality of lamps, a decoder for controlling the lamps in response to a control unit executing a fault diagnostic function on each port. The apparatus, and method therefore, is capable of displaying a fault-state irrespective of the number of lamps for displaying the fault-state and a type of fault diagnostic function, and recording the fault-state detected for each port. To carry out a spirit of the invention, the subject comprises a first stage for recording a fault-state generated from the subscriber's card and a second stage for controlling a plurality of lamps for displaying the fault-state.

8 Claims, 3 Drawing Sheets

METHOD AND APPARATUS FOR CONTROLLING FAULT-STATE DISPLAYING OF A SUBSCRIBER'S CARD IN SWITCHING SYSTEM

BACKGROUND OF THE INVENTION

The present invention relates to a method for controlling a fault-state displaying means for a subscriber's card in a switching system, and in particular to a method capable of displaying a fault-state irrespective of the number of lamps for displaying the fault-state and a type of fault diagnostic function.

Usually, a switching system includes a number of boards having various functions, and a subscriber's board (or card) also includes a number of input/output ports (I/O ports).

Since the subscriber's board has $2^n$ ($n \geq 0$) ports, 1, 2, 4, 8, 16, 32, 64, ..., $2^n$ numbers of I/O ports are contained in one subscriber's card. Also, a conventional switching system has a fault detecting function capable of detecting an operation error for the subscriber's port as above, and a plurality of lamps capable of displaying a state of fault type for each of the ports are attached thereto. For example, if the fault diagnostic function for each of the ports is of three types, a number of lamps are included to display respectively the three types of fault states for all of the number of contained ports.

Therefore, the number of lamps for displaying the fault state of the ports contained in the subscriber's board (card) is large in number, and further the structure of control logic for controlling the lamps' display is complicated. Thus, when the number of lamps mounted are as many as the number of ports on one board, a location of ports originating with a fault can be correctly displayed, however, there has been a problem that a pattern of the card becomes complicated because of an increase in the number of circuit components required additionally accompanying therewith and increasing a signal and bus for controlling the operation of the circuit components.

Therefore, when as many lamps are mounted as many as the numbers corresponding to the I/O ports are mounted, the circuit is complicated because of the increase of processing quantities, so accordingly it causes a problem that the reliability of the board decreases.

SUMMARY OF THE INVENTION

It is accordingly an object of the present invention to provide a method capable of displaying a fault-state irrespective of the number of lamps for displaying the types of a fault diagnostic function and its fault state.

It is another object of the present invention to provide a method for recording a fault-state detected for each port.

According to one aspect of the invention, a method to achieve the object comprises a first stage for recording a fault-state generated from the subscriber's card and a second stage for controlling a plurality of lamps for displaying the fault-state.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION OF THE INVENTION

Hereinafter, the present invention will be described in detail with reference to the accompanying drawings.

Figure 1:
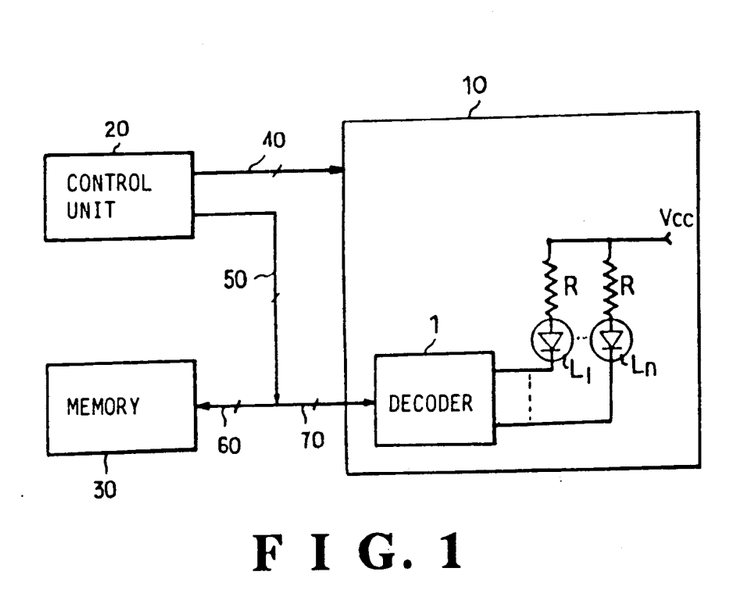
FIG. 1 is a block diagram for carrying out the present invention.

FIG. 1 is a block diagram for carrying out the present invention, in which the embodiment disclosed includes a subscriber's board 10 having a number of subscriber's ports and including a predetermined number of light emitting diodes L1-Ln for displaying the fault-state of a certain port, and a decoder 1 for displaying a predetermined signal and controlling said light emitting diodes L1-Ln to be displayed; a control unit 20 for executing the fault diagnostic function of each port of subscriber's board 10 according to a predetermined program; and a memory 30 for accessing data under the control of said control unit 20.

Figure 2:
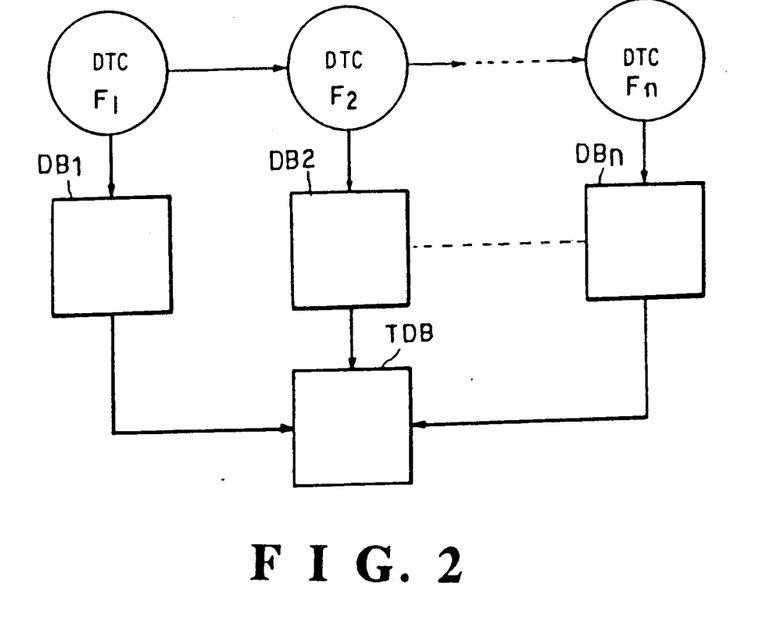
FIG. 2 is a state diagram for recording a fault-state according to the present invention.

FIG. 2 is a state diagram for recording the fault-state according to the present invention, which comprises a first state for executing the fault diagnostic detection for each subscriber's port and saving the detected state to a corresponding fault diagnostic detection memory, and a second state for executing an arithmetic OR operation to the fault diagnostic state detected for each port at the first state in order to save it in the memory.

Therefore, a plurality of data bases (memory) (DB1, DB2, ..., DBn) of FIG. 2 are assigned by one bit for each port within the board. Hence, when is in a normal state of the fault-state being not detected, it records a logic value "0", while it is not in a normal state of the fault-state being detected, it records a logic value "1".

Since a general subscriber's board has the involution of 2 ($2^n$) bits, said data base which is $2^n$ bits, i.e., n=1, 2, 4, 8 in accumulating the results executed each fault detecting function requires the memory having unit of 2 bit, 1 nibble, byte, 1 word and the like. Accordingly, when the subscriber's board has 8 ports, a memory region of a total data base (TDB) for recording the information of OR operation for the data the base (DB1, DB2 ... DBn) for recording said each fault-states is equal to said data base (DB1, ..., DBn) in size.

Figure 3:
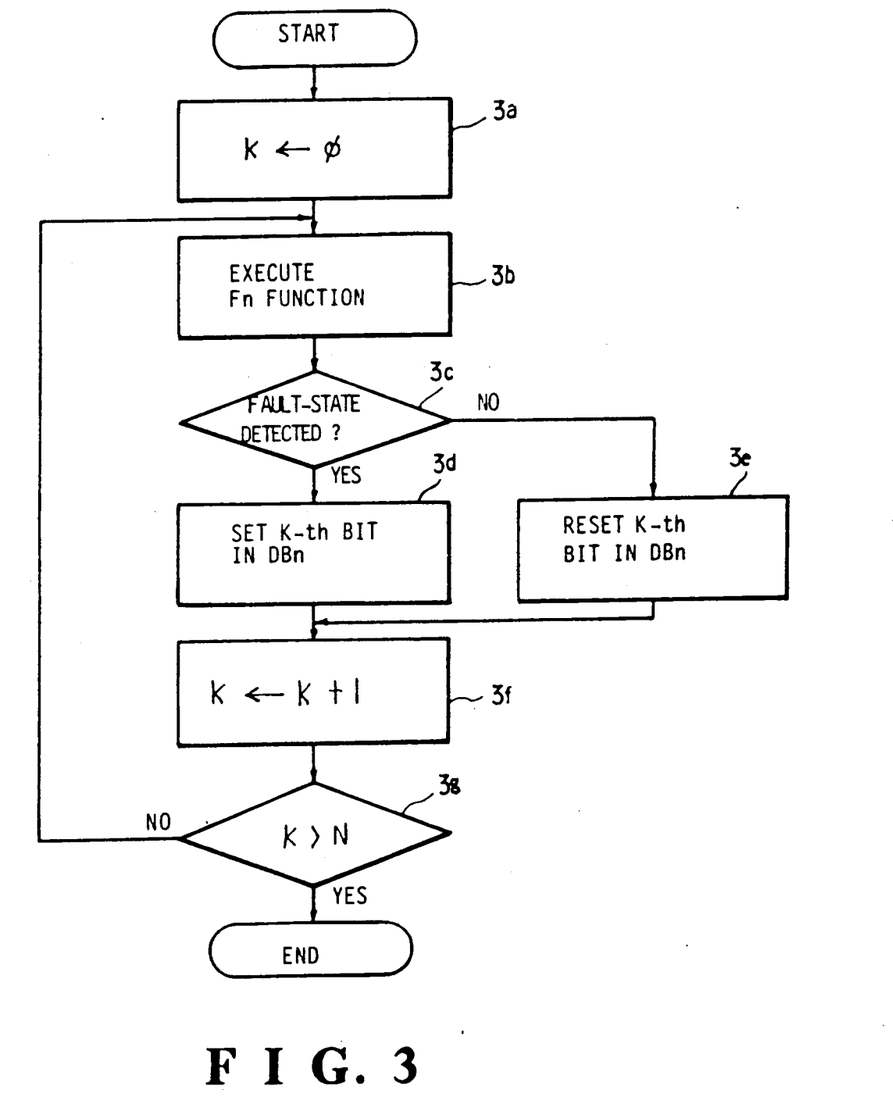
FIG. 3 is a flow chart for recording a fault-state according to the present invention.

FIG. 3 is a flow chart for recording the fault state according to the present invention, which is comprised of: a first process for executing the fault diagnostic function from any of subscriber's port, and detecting the result of fault diagnostic state of present port; a second process for setting/resetting according to the result of said first process a bit corresponding to a bit position of present port; a third process for increasing present port and changing the subscriber's port of fault diagnosis from present port; and a fourth process for detecting whether or not the present position of subscriber's port of fault diagnosis exceeded the final port of total ports, repeating from said first process when it is not exceeded and terminating the fault diagnostic function when it is exceeded.

Figure 4:
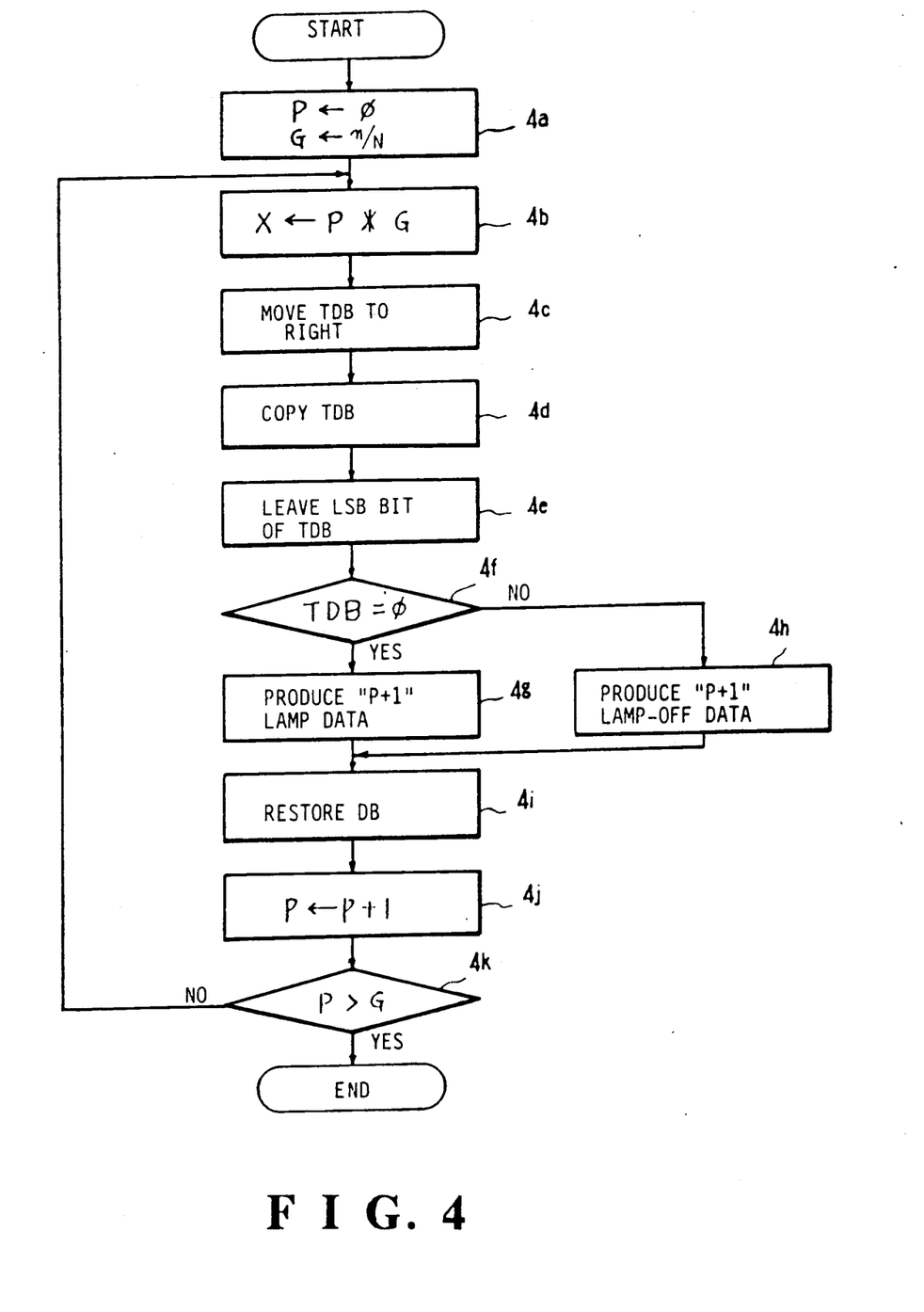
FIG. 4 is a flow chart for controlling lamps according to the present invention.

FIG. 4 is a flow chart for controlling the lamps according to the present invention, which is comprised of; a first process for initializing a sequence variable "P" representing the sequence of subscriber's port, and designating a value G obtained by dividing the number n of ports by the number N of lamps and counting the group;

a second process for counting a determinating variable X by multiplying the sequence variable P of subscriber's port to the group G counted at said first process and determining a bit position within the group, and moving to LSB direction as much as said counted position determinating variable X and determining the bit position; a third process for copying the data base having fault detecting information into a predetermined memory region and leaving only a bit in the LSB (least significant bit) X position at said data base; a fourth process for detecting a fault diagnostic state by the position determinating bit; a fifth process for adding one to the sequence variable P of present subscriber's port upon detecting a fault at said third process and lighting on by driving a lamp of the corresponding group, thereafter adding one to the sequence variable P of present subscriber's port when a fault-state is not detected, and turning off the light of lamp of corresponding group; a sixth process for recovering the data base copied at said third process, and increasing by one the sequence variable P of present subscriber's port, thereby detecting whether or not it is larger than the group number G counted at the first process; and a seventh process for terminating the control of lamp display means when the port sequence variable P increased in detection of said sixth process is larger than the group number G, and otherwise, i.e., when it is less than G, returning to said second process.

Hereinafter, in explaining the operational example according to the present invention with reference to FIG. 1 through FIG. 4, it will be explained under the assumption that functions for detecting a fault-state of each port of subscriber's board have different diagnostic detections (DTC) of F1, F2, ... Fn.

Now, in order to execute a fault diagnostic function F1 of each ports, the control unit 20 of FIG. 1 being contained within a subscriber's board 10, a variable K designating any of ports within said subscriber's board 10 is initialized to "0" at a step 3a of FIG. 3. The control unit 20, after initializing the variable K designating any of ports at said step 3a of FIG. 3, executes a fault diagnostic detection F1 to K-th port at a step 3b. The fault diagnostic detection executed at said step 3b is carried out by applying conventional fault diagnostic function. The control unit 20, after executing a fault diagnosis F1 as said step 3b, detects whether or not the fault is detected for present K-th subscriber's port at a step 3c.

Then, when a fault is detected, according to the state of said fault diagnosis F1 K-th bit of data base (memory) DB1 of FIG. 2 is set at a step 3d, whereas when it is not detected, K-th bit of data base DB1 is reset at step 3e. The control unit 20 which has executed said step 3d or step 3e increases the present subscriber's port K by one at a step 3f, and detects whether or not the present subscriber's port number K is larger than total subscriber's port sequence number N at a step 3g.

When presently designated subscriber's port K did not exceed the total subscriber's port sequence number N, aforementioned step 3b is executed in order to execute a fault diagnostic function F1 to presently designated subscriber's port K, when exceeded, it is judged that the fault diagnosis F1 is executed at every subscriber's port and the fault diagnostic detection functional F1 of each ports is terminated, and thereby a bit map representing the state of each ports for the fault detecting function F1 is constituted at a data base DB1. The control unit 20 which has executed the fault diagnosis detecting function F1 of FIG. 2 at every respective port saves respectively the fault diagnosis detecting information corresponding to each port to the data base DB1, in order to execute the fault diagnosis detecting function F2 for each port, it initializes the variable K designating any of ports as described above in FIG. 3 and designates an initial port, and executes the fault diagnostic function F2 from said designated port. Therefore, when each fault diagnosis detecting functions (F2, F3, ... Fn) of FIG. 2 are detected to the level as in FIG. 3, bit map representing the state of each ports for each detecting functions (F1, F2, ... Fn) are constituted at data base (DB1, DB2, ... DBn).

The control unit 20 which has executed and completed each fault diagnosis detecting function (FI, F2, ... Fn) as aforementioned to each ports carries out OR operation for the values of data base (DB1, DB2, DBm) located within the memory 30, and saves their results at the total data base TDB located within said memory 30. Therefore, the K-th bit of said total data base TDB being set means that at least one fault is detected for a number of fault diagnosis detecting faction with the K-th subscriber's port, and a reset state of said bit means that the K-th subscriber's port at present is normal for all of the fault diagnostic function.

The control unit 20 which has saved the information of Or operation to the total data base TDB by executing respective fault diagnosis detecting function for each port according to the flow chart as said FIG. 3 carries out a step 4a of FIG. 4 in order to display the fault state of each port. At step 4a, the system initializes to 0 the sequence variable P representing the sequence of subscriber's port, and counts the number G of groups, by dividing the number n of total ports by the number N of lamps. Since the total port number n of said step 4a is equal to the number of the total data base TDB, when the bit number of said total data base TDB is divided by the number N of lamps, a constant G which is the number of group can be counted. Therefore, at said step 4a, when the bit of the constant G number makes one group, the total subscriber's port number n can be divided into many groups. It is divided such that from first bit to X-th bit is a first group, from X+1-th bit to 2X-th bit is a second group, and the like. Therefore, since the relation between lamps and each group divided at said step 4a is confronting relation of 1:1, all of bit belonging to the group can display the fault-state of a port belonging to group according to reset/set.

The control unit 20 which has executed said step 4a multiplies a sequence variable P of a subscriber's port representing the sequence of subscriber's port by the present group number G, and counts to determine the initial bit position determinating variable X belonging to the group at a step 4b. The control unit 20 which has counted and determined the initial bit position belonging to the group at said step 4b moves the bit position to the direction of LSB as much as bit position determinating variable X in a position region of data base group G located within the memory 30 at a step 4c, and detects the location of lowest position within group. This is for making the masking easy.

The control unit 20 which has executed said step 4c saves (or copies) the total data base TDB having OR operating information of fault diagnostic detecting function of all subscriber's port within the memory 30 to other portion of the (not shown) memory at a step 4d. The control unit 20 which has executed said step 4d leaves only a bit of X position of LSB of data base TDB within the memory 30 at a step 4e, and detects the logic state present information at a step 4f.

When the data bit detected at said step 4f is "0", by one is increased the port sequence variable P representing the present port and the data capable of turning "on" the lamp corresponding to P+1-th group is outputted to the decoder 1 within subscriber's board 10 at a step 4g, thereafter when the detected data bit is "1" the data for turning "off" the lamp corresponding to P+1-th group is outputted to the decoder 1 at a step 4h. Therefore, the reason of increasing by the one port sequence variable P representing the present port variable is to initialize the sequence variable P to O at the step 4a. On the other hand, the decoder 1 which has inputted the data outputted during said step 4g or 4h decodes it and displays the lamps (light emitting diodes) (L1, L2, ... Ln) of a corresponding group.

The control unit 20 which has outputted the lamp driving data at said step 4g or 4h restores the total data base TDB saved in a predetermined memory region at a step 4i and, by increasing the present port sequence variable P by one at step 4j, detects whether the increased port sequence variable P is larger than the group number G at a step 4k. When the sequence variable P increased at the detecting step of said 4j is less than the group number G, the control unit repeats from aforementioned step 4b to determine the position of a first bit of next group re-execute the corresponding process, and however when it is larger, the system judges that the lamp control for all groups is ended, terminating the lamp control.

As aforementioned, the present invention has advantages that the information of various fault-states of each ports of a subscriber's board is stored by bit unit to each data base formed with bit map in accordance to each fault-state, and the information of OR operation of the data base of which every port has each fault-state informations is processed by group unit in dual group bit, and the fault-state of each port is displayed irrespective of the type and lamp number of fault diagnostic function of port, so that the number of lamps for displaying the fault state can be controlled arbitrarily in accordance to the pattern of subscriber's card.

Although specific constructions and procedures of the invention have been illustrated and described herein, it is not intended that the invention be limited to the elements and constructions disclosed. One skilled in the art will easily recognize that the particular elements or subconstructions may be used without departing from the scope and spirit of the invention.

What is claimed is:

1. A method for controlling fault-state displaying of a subscriber's card in a switching system, comprising:
a first stage for recording a fault-state generated from testing the subscriber's card, and first stage comprising the steps of:
    (a) initializing a position variable corresponding to one of a plurality of ports in said card;
    (b) executing a fault diagnostic function on said one of said plurality of ports, and detecting a result of the fault diagnostic function said result indicating a fault-state of said one port;
    (c) setting/resetting a bit corresponding to a bit position of said one port according to said result;
    (d) increasing a value assigned to said position variable to select a next higher port for fault diagnosis; and
    (e) detecting whether or not the value of said position variable exceeds a value equal to the total number of said plurality of ports, thereby executing again said steps (b)-(e) for said next higher port if said value of said position variable did not exceed said value equal to the total number of said plurality of ports, and ending the fault diagnostic function if said value of said position variable exceeds said value equal to the total number of said plurality of ports;
a second stage for controlling a plurality of lamps for displaying the fault-state, said second state comprising the steps of:
    (a)' initializing a sequence variable P representing a port sequence, and designating a group value G obtained by dividing a port number n by a lamp number N to count a number of groups;
    (b)' counting a bit position determining variable X in a group by multiplying the sequence variable P by the group value G counted at said step (a)', and moving to a direction of the least significant bit as much as said counted bit position determining variable X, thereby to determine the bit position;
    (c)' copying a data base having a fault detecting information into a given memory region, and leaving only a bit at the least significant bit X position in the data base;
    (d)' detecting a fault diagnostic state by use of the bit position determining variable X;
    (e)' increasing by one the sequence variable P, if a fault-state is detected in said detecting step (d)' so as to drive a lamp of a corresponding group to turn on the lamp, or increasing by one the present subscriber's port sequence variable P if the fault-state is not detected and turning off a lamp of a corresponding group;
    (f)' recovering the data base which is copied at said step (c)', and increasing by one the port sequence variable P and thereby detect whether or not said sequence variable P is larger than the group value G counted at said step (a)'; and
    (g)' ending the lamp controlling second stage if said sequence variable P is larger than the group value G in said step (f)' and returning to said step (b)' if the sequence variable P is less than the group G.

2. A fault diagnostic circuit for controlling fault-state display of a subscriber's card in a switching system, comprising:
control means for executing a fault diagnostic function on a subscriber's board; and
memory means for accessing data under control of said control means;
wherein said control executes said fault diagnostic function in:
a first stage for recording a fault-state generated from a subscriber's card, said first stage comprising the steps of:
    executing a fault diagnostic function and detecting a result of a fault diagnostic state of a current port, from any of a subscriber's ports;
    setting a corresponding bit to the current port in dependence upon said result;
    increasing the current port to change the subscriber's port for the fault diagnosis from the present port; and
    detecting whether the position of the subscriber's port of present fault diagnosis passed through a final port of total port, thereby executing again said step of executing a fault diagnostic function if it did not pass the final port, and ending the fault diagnostic function if it passed the final port; and, a second stage for controlling a plurality of lamps for displaying the fault-state.

3. The circuit of claim 2, wherein said second stage comprises the steps of:

(a)' initializing a sequence variable P representing a port sequence, and designating a group value G obtained by dividing a port number n by a lamp number N to count a number of groups;

(b)' counting a bit position determining variable X in a group by multiplying the sequence variable P by the group value G counted at said step (a)', and moving to a direction of the least significant bit as much as said counted bit position determining variable X, thereby to determine the bit position;

(c)' copying a data base having a fault detecting information into a given memory region, and leaving only a bit at the least significant bit X position in the data base;

(d)' detecting a fault diagnostic state by use of the bit position determining variable X;

(e)' increasing by one the sequence variable P, if a fault-state is detected in said detecting step (d)' so as to drive a lamp of a corresponding group to turn on the lamp, or increasing by one the present subscriber's port sequence variable P if the fault-state is not detected and turning off a lamp of a corresponding group;

(f)' recovering the data base which is copied at said step (c)', and increasing by one the port sequence variable P and thereby detect whether or not said sequence variable P is larger than the group value G counted at said step (a)'; and (g)' ending the lamp controlling second stage if said sequence variable P is larger than the group value G in said step (f)' and returning to said step (b)' if the sequence variable P is less than the group G.

4. An apparatus for controlling fault-state displaying of a subscriber's card in a switching system, comprising:

said subscriber's card having a plurality of ports each having a predetermined number of light emitting diodes for displaying a fault-state of corresponding ones of said plurality of ports;

decoder means for displaying a predetermined signal and for controlling each of said light emitting diodes;

control means for executing a fault diagnostic function on each of said ports according to a predetermined program; and memory means responsive to said control means for storing data generated by said control means.

5. The apparatus for controlling fault-state displaying of a subscriber's card in a switching system as set forth in claim 4, wherein said control means comprises:

a first stage for recording into said memory means a fault state generated from testing the subscriber's card, wherein said first stage:

(a) initializes a position variable corresponding to one of said plurality of ports in said card, (b) executes a fault diagnostic function on said one of said plurality of ports, and detects a result of the fault diagnostic function said result indicating a fault-state of said one port, (c) sets/resets a bit corresponding to a bit position of said one port according to said result, (d) increases a value assigned to said position variable to select a next higher port for fault diagnosis, and (e) detects whether the value of said position variable exceeds a value equal to the total number of said plurality of ports.

6. The apparatus for controlling fault-state displaying of a subscriber's card in a switching system as set forth in claim 5, wherein said first stage executes again functions (b)–(e) for said next higher port if said value of said position variable did not exceed said value equal to the total number of said plurality of ports, and the fault diagnostic function if said value of said position variable exceeds said value equal to the total number of said plurality of ports.

7. The apparatus for controlling fault-state displaying of a subscriber's card in a switching system as set forth in claim 6, wherein said control means further comprises:

a second stage for controlling a plurality of lamps for displaying the fault-state, wherein said second stage:

(a)' initializes a sequence variable P representing a port sequence, and designates a group value G obtained by dividing a port number n by a lamp number N to count a number of groups, (b)' counts a bit position determining variable X in a group by multiplying the sequence variable P by the group value G counted at step (a)', and moving to a direction of the least significant bit as much as said counted bit position determining variable X, thereby to determine the bit position, (c)' copies a data base having fault detecting information into a given memory region, and leaves only a bit at the least significant bit X position in the data base, (d)' detects a fault diagnostic state by use of the bit position determining variable X, (e)' increases by one the sequence variable P, if a fault-state is detected in step (d)' so as to drive a lamp of a corresponding group to turn on the lamp, or increasing by one the present subscriber's port sequence variable P if the fault-state is not detected and turning off a lamp of a corresponding group, (f)' recovers the data base which is copied at step (c)', and increasing by one the port sequence variable P and thereby detect whether said sequence variable P is larger than the group value G counted at step (a)', and (g)' ends the lamp controlling second stage if said sequence variable P is larger than the group value G in step (f)' and returns to step (b)' if the sequence variable P is less than the group G.

8. The apparatus for controlling fault-state displaying of a subscriber's card in a switching system as set forth in claim 5, wherein said control means further comprises:

a second stage for controlling a plurality of lamps for displaying the fault-state, said second stage:

(a)' initializes a sequence variable P representing a port sequence, and designates a group value G obtained by dividing a port number n by a lamp number N to count a number of groups, (b)' counts a bit position determining variable X in a group by multiplying the sequence variable P by the group value G counted at step (a)', and moving to a direction of the least significant bit as much as said counted bit position determining variable X, to thereby determine the bit position.

(c)' copies a data base having fault detecting information into a given memory region, and leaves only a bit at the least significant bit X position in the data base, (d)' detects a fault diagnostic state by use of the bit position determining variable X, (e)' increases by one the sequence variable P, if a fault-state is detected in step (d)' so as to drive a lamp of a corresponding group to turn on the lamp, or increasing by one the present subscriber's port sequence variable P if the fault-state is not detected and turning off a lamp of a corresponding group, (f)' recovers the data base which is copied at step (c)', and increasing by one the port sequence variable P and thereby detect whether of not said sequence variable P is larger than the group value G counted at step (a)', and (g)' ends the lamp controlling second stage if said sequence variable P is larger than the group value G in step (f)' and returns to step (b)' if the sequence variable P is less than the group G.

* * * * *

UNITED STATES PATENT AND TRADEMARK OFFICE
CERTIFICATE OF CORRECTION

PATENT NO. : 5,042,035

DATED : August 20, 1991

INVENTOR(S) : Jong-Yung Choi

It is certified that error appears in the above-identified patent and that said Letters Patent is hereby corrected as shown below:

Column 1,   Line 42,   delete "as many" (second occurrence);

Line 43,   delete "are";

Line 44,   delete "mounted";

Column 2,   Line 25,   change "invention" to --embodiment--, and change

"comprises" to --includes--;

Claim 1,   Column 6,   Line 12,   change "state" to --stage--;

UNITED STATES PATENT AND TRADEMARK OFFICE
CERTIFICATE OF CORRECTION

PATENT NO. : 5,042,035

DATED : August 20, 1991

INVENTOR(S) : Jong-Yung Choi

It is certified that error appears in the above-identified patent and that said Letters Patent is hereby corrected as shown below:

Claim 4, Column 7, Line 42, delete "of a subscriber's card";

Line 43, change "said" to --a--.

Signed and Sealed this

Eighth Day of December, 1992

Attest:

DOUGLAS B. COMER

*Attesting Officer*  *Acting Commissioner of Patents and Trademarks*